(12) United States Patent
Zhang et al.

(10) Patent No.: US 10,318,931 B2
(45) Date of Patent: Jun. 11, 2019

(54) METHOD AND SYSTEM FOR DETERMINING MAINTENANCE POLICY OF COMPLEX FORMING DEVICE

(71) Applicant: Hefei University of Technology, Hefei, Anhui (CN)

(72) Inventors: Qiang Zhang, Anhui (CN); Wanying Wang, Anhui (CN); Zhanglin Peng, Anhui (CN); Xiaonong Lu, Anhui (CN); Jun Pei, Anhui (CN); Yu Fan, Anhui (CN); Jianwen Yan, Anhui (CN)

(73) Assignee: Hefei University of Technology, Hefei Anhui (CN)

( * ) Notice: Subject to any disclaimer, the term of this patent is extended or adjusted under 35 U.S.C. 154(b) by 0 days.

(21) Appl. No.: 16/137,558

(22) Filed: Sep. 21, 2018

(65) Prior Publication Data

US 2019/0095876 A1 Mar. 28, 2019

(51) Int. Cl.
*G06Q 10/00* (2012.01)
*G06N 3/08* (2006.01)

(52) U.S. Cl.
CPC ............... *G06Q 10/20* (2013.01); *G06N 3/08* (2013.01)

(58) Field of Classification Search
USPC ........................................................ 705/305
See application file for complete search history.

(56) References Cited

U.S. PATENT DOCUMENTS

2016/0140155 A1* 5/2016 Bothier ................ G05B 23/024
707/812

FOREIGN PATENT DOCUMENTS

| CN | 1987697 A | 6/2007 |
|---|---|---|
| CN | 101196743 A | 6/2008 |
| CN | 101446827 A | 6/2009 |
| CN | 102205928 A | 10/2011 |
| CN | 105512801 A | 4/2016 |
| CN | 105550755 A | 5/2016 |

(Continued)

OTHER PUBLICATIONS

Jahnke, Patrick, Machine Learning Approaches for Failure Type Detection and Predictive Maintenance, Technische Universitat Darmstadt, dated Jun. 19, 2015 (Year: 2015).*

*Primary Examiner* — Lynda Jasmin
*Assistant Examiner* — Michael Young
(74) *Attorney, Agent, or Firm* — Wayne & Ken, LLC (57) ABSTRACT

The present invention discloses a method and system for determining a maintenance policy of a complex forming device. The method and system include: establishing a performance judgement standard; obtaining actual operation data; and determining a performance stage of the complex forming device, and determining the maintenance policy of the complex forming device. The establishing a performance judgement standard includes allocating data located at different performance stages to corresponding working condition units; setting data located at a normal performance stage to normal reference data, and calculating, by using a shortest path algorithm, distances between operation data of different working condition units in different functional modules and the normal reference data, to obtain performance statuses of the different functional modules. In view of this, by using the method and system provided in the present invention, a suitable maintenance policy can be selected for the complex forming device, thereby reducing maintenance costs.

2 Claims, 4 Drawing Sheets

(56) References Cited

FOREIGN PATENT DOCUMENTS

CN 106650963 A 5/2017
EP 2645313 A1 10/2013

* cited by examiner

METHOD AND SYSTEM FOR DETERMINING MAINTENANCE POLICY OF COMPLEX FORMING DEVICE

CROSS-REFERENCE TO RELATED APPLICATIONS

This application claims priority to Chinese application No. 201710864563.9 with a filing date of Sep. 22, 2017. The content of the aforementioned applications, including any intervening amendments thereto, are incorporated herein by reference.

TECHNICAL FIELD

The present invention relates to the field of device maintenance, and in particular, to a method and system for determining a maintenance policy of a complex forming device.

BACKGROUND OF THE PRESENT INVENTION

With the development of the manufacturing industry, the manufactured workpieces are becoming increasingly complicated and flexible. The demand for high-precision and complex-shaped forgings is increasing in device parts, that is, the demand for complex forming devices capable of completing various forming requirements is also increasing. The complex forming device has a poor working environment, a complicated structure, various functions, and various working conditions, and involves a relatively large amount of operation data. Therefore, it is difficult to estimate the performance operating status of the complex forming device, and then it is also difficult to determine a maintenance policy of the complex forming device according to the performance operating status. Therefore, how to select a suitable maintenance policy of the complex forming device to reduce maintenance costs is a technical problem urgently to be solved in the device maintenance field.

SUMMARY OF THE PRESENT INVENTION

The objective of the present invention is to provide a method and system for determining a maintenance policy of a complex forming device, to select a suitable maintenance policy for the complex forming device, thereby reducing maintenance costs.

To achieve the foregoing objective, the present invention provides the following solutions:

A method executed by a computer for determining a maintenance policy of a complex forming device, wherein the maintenance policy determining method includes:

obtaining a plurality of sample data sets, and the sample data sets are sample data sets with maintenance policy labels, and the maintenance policy labels include a normal performance label, a caring label, a maintenance label, a repair label, and a replacement label;

obtaining functional modules of the complex forming device and working condition units included in the functional modules;

establishing a working condition hierarchical identification model according to the functional modules and the working condition units included in the functional modules;

classifying data items in each sample data set respectively according to the working condition hierarchical identification model, to obtain a plurality of subsets with normal performance labels, a plurality of subsets with caring labels, a plurality of subsets with maintenance labels, a plurality of subsets with repair labels, and a plurality of subsets with replacement labels, wherein the data item in each subset is operation data describing each working condition unit;

processing each subset with a normal performance label to obtain a plurality of reference subsets, wherein the data item in the reference subset is operation data describing each working condition unit in a normal performance status of the complex forming device;

separately calculating distances between each reference subset and each subset with a normal performance label, each subset with a caring label, each subset with a maintenance label, each subset with a repair label, and each subset with a replacement label by using a shortest path algorithm, and determining a performance set with a normal performance label, a performance set with a caring label, a performance set with a maintenance label, a performance set with a repair label, and a performance set with a replacement label of the complex forming device, wherein elements in the performance sets are the distances between the reference subset and the subset with a normal performance label, the subset with a caring label, the subset with a maintenance label, the subset with a repair label, and the subset with a replacement label respectively;

obtaining actual operation data of a working cycle in the complex forming device;

determining an actual operation performance set of the complex forming device according to the actual operation data, the working condition hierarchical identification model, and the shortest path algorithm;

separately calculating Euclidean distances between the actual operation performance set and the performance set with a normal performance label, the performance set with a caring label, the performance set with a maintenance label, the performance set with a repair label, and the performance set with a replacement label, and selecting Euclidean distances within a specified threshold range;

determining a winning Euclidean distance according to the selected Euclidean distances by using a voting method; and according to the winning Euclidean distance, determining a label, with a maintenance policy, of the sample data set corresponding to the winning Euclidean distance, and determining the maintenance policy denoted in the label with the maintenance policy as the maintenance policy and the complex forming device.

Optionally, the classifying data items in each sample data set respectively according to the working condition hierarchical identification model to obtain a plurality of subsets with normal performance labels, a plurality of subsets with caring labels, a plurality of subsets with maintenance labels, a plurality of subsets with repair labels, and a plurality of subsets with replacement labels specifically includes:

classifying the data items in each sample data set respectively according to a description requirement of each functional module in the working condition hierarchical identification model, to obtain a plurality of feature subsets with normal performance labels, a plurality of feature subsets with caring labels, a plurality of feature subsets with maintenance labels, a plurality of feature subsets with repair labels, and a plurality of feature subsets with replacement labels, wherein the data item in the feature subset is operation data describing the functional module;

obtaining operating status sample data of each working condition unit;

using a neural network allocation algorithm according to the operating status sample data of each working condition unit to obtain a trained neural network model;

inputting each feature subset with a normal performance label, each feature subset with a caring label, each feature subset with a maintenance label, each feature subset with a repair label, and each feature subset with a replacement label into the trained neural network model, to obtain a plurality of subsets with normal performance labels, a plurality of subsets with caring labels, a plurality of subsets with maintenance labels, a plurality of subsets with repair labels, and a plurality of subsets with replacement labels.

Optionally, the processing each subset with a normal performance label to obtain a plurality of reference subsets specifically includes:

each subset with a normal performance label including a plurality of numeric data items and a plurality of non-numeric data items;

for the numeric data items, calculating an average value of the plurality of numeric data items;

for the non-numeric data items, obtaining a standard value of the plurality of non-numeric data items by using a mode method; and obtaining the reference subset of each working condition unit according to the average value and the standard value.

Optionally, the separately calculating the distances between each reference subset and each subset by using the shortest path algorithm and determining the performance set with a normal performance label, the performance set with a caring label, the performance set with a maintenance label, the performance set with a repair label, and the performance set with a replacement label of the complex forming device specifically include:

separately calculating the distances between each reference subset and each subset by using the shortest path algorithm;

obtaining a weight of each distance according to a cross validation algorithm; and determining the performance set with a normal performance label, the performance set with a caring label, the performance set with a maintenance label, the performance set with a repair label, and the performance set with a replacement label of the complex forming device according to the distances between the reference subset and each subset and the weights of the distances.

Optionally, the determining an actual operation performance set according to the actual operation data, the working condition hierarchical identification model, and the shortest path algorithm specifically includes:

classifying the actual operation data according to the working condition hierarchical identification model, to obtain a plurality of subsets of the actual operation data; and calculating, by using the shortest path algorithm, distances between the reference subset and each subset of the actual operation data, and determining the actual operation performance set of the complex forming device.

The present invention further provides a system for determining a maintenance policy of a complex forming device, wherein the maintenance policy determining system includes:

an obtaining part and a processing part; wherein the obtaining part is communicatively connected to the processing part; and the processing part includes one or more non-volatile memories, and a processor, wherein the processor includes a sample data set obtaining module configured to obtain a plurality of sample data sets by using the obtaining part; and the sample data sets are sample data sets with maintenance policy labels, and the maintenance policy labels include a normal performance label, a caring label, a maintenance label, a repair label, and a replacement label;

a functional module and working condition unit obtaining module configured to obtain functional modules of the complex forming device and working condition units included in the functional modules by using the obtaining part;

a working condition hierarchical identification model establishment module configured to establish a working condition hierarchical identification model according to the functional modules and the working condition units included in the functional modules;

a subset obtaining module configured to classify data items in each sample data set respectively according to the working condition hierarchical identification model, to obtain a plurality of subsets with normal performance labels, a plurality of subsets with caring labels, a plurality of subsets with maintenance labels, a plurality of subsets with repair labels, and a plurality of subsets with replacement labels, wherein the data item in each subset is operation data describing each working condition unit; and a reference subset obtaining module configured to process each subset with a normal performance label to obtain a plurality of reference subsets, wherein the data item in the reference subset is operation data describing each working condition unit in a normal performance status of the complex forming device; and a performance set determining module configured to use a shortest path algorithm, separately calculate distances between each reference subset and each subset with a normal performance label, each subset with a caring label, each subset with a maintenance label, each subset with a repair label, and each subset with a replacement label, and determine a performance set with a normal performance label, a performance set with a caring label, a performance set with a maintenance label, a performance set with a repair label, and a performance set with a replacement label of the complex forming device, wherein elements in the performance sets are the distances between the reference subset and the subset with a normal performance label, the subset with a caring label, the subset with a maintenance label, the subset with a repair label, and the subset with a replacement label respectively;

an actual operation data obtaining module configured to obtain actual operation data of a working cycle in the complex forming device;

an actual operation performance set determining module configured to determine an actual operation performance set of the complex forming device according to the actual operation data, the working condition hierarchical identification model, and the shortest path algorithm, wherein an Euclidean distance calculation module configured to separately calculate Euclidean distances between the actual operation performance set and the performance set with a normal performance label, the performance set with a caring label, the performance set with a maintenance label, the performance set with a repair label, and the performance set with a replacement label, and select Euclidean distances within a specified threshold range;

a winning Euclidean distance determining module configured to determine a winning Euclidean distance according to the selected Euclidean distances by using a voting method; and a maintenance policy determining module configured to: according to the winning Euclidean distance, determine a label, with a maintenance policy, of the sample data set corresponding to the winning Euclidean distance, and determine the maintenance policy denoted in the label with the maintenance policy as the maintenance policy of the complex forming device.

Optionally, the subset obtaining module specifically includes:

a feature subset obtaining unit configured to classify the data items in each sample data set respectively according to a description requirement of each functional module in the working condition hierarchical identification model, to obtain a plurality of feature subsets with normal performance labels, a plurality of feature subsets with caring labels, a plurality of feature subsets with maintenance labels, a plurality of feature subsets with repair labels, and a plurality of feature subsets with replacement labels, wherein the data item in the feature subset is operation data describing the functional module;

a working condition unit operating status sample data obtaining unit configured to obtain operating status sample data of each working condition unit;

a trained neural network model obtaining unit configured to use a neural network allocation algorithm according to the operating status sample data of each working condition unit to obtain a trained neural network model; and a subset obtaining unit configured to input each feature subset with a normal performance label, each feature subset with a caring label, each feature subset with a maintenance label, each feature subset with a repair label, and each feature subset with a replacement label into the trained neural network model, to obtain a plurality of subsets with normal performance labels, a plurality of subsets with caring labels, a plurality of subsets with maintenance labels, a plurality of subsets with repair labels, and a plurality of subsets with replacement labels.

Optionally, the reference subset obtaining module specifically includes:

an average value calculation unit configured to calculate an average value of the plurality of numeric data items when data items of the subset with a normal performance label are numeric data items;

a standard value obtaining unit configured to obtain a standard value of the plurality of non-numeric data items by using a mode method when the data items of the subset with a normal performance label are non-numeric data items; and a reference subset obtaining unit configured to obtain the reference subset of each working condition unit according to the average value and the standard value.

Optionally, the performance set determining module specifically includes:

a distance calculation unit configured to separately calculate the distances between each reference subset and each subset by using the shortest path algorithm;

a weight obtaining unit configured to obtain a weight of each distance according to a cross validation algorithm; and a performance set determining unit configured to determine the performance set with a normal performance label, the performance set with a caring label, the performance set with a maintenance label, the performance set with a repair label, and the performance set with a replacement label of the complex forming device according to the distances between the reference subset and each subset and the weights of the distances.

Optionally, the actual operation performance set determining module specifically includes:

an actual operation data subset obtaining unit configured to classify the actual operation data according to the working condition hierarchical identification model, to obtain a plurality of subsets of the actual operation data; and an actual operation performance set determining unit configured to calculate, by using the shortest path algorithm, distances between the reference subset and each subset of the actual operation data, and determine the actual operation performance set of the complex forming device.

According to the specific embodiments provided in the present invention, the present invention discloses the following technical effects: the present invention provides a method and system for determining a maintenance policy of a complex forming device, including: first, obtaining a plurality of sample data sets with maintenance policy labels, wherein the maintenance policy labels include a normal performance label, a caring label, a maintenance label, a repair label, and a replacement label; and establishing a working condition hierarchical identification model, and classifying data items in each sample data set respectively according to the working condition hierarchical identification model, to obtain a plurality of subsets with normal performance labels, a plurality of subsets with caring labels, a plurality of subsets with maintenance labels, a plurality of subsets with repair labels, and a plurality of subsets with replacement labels, wherein the data item in each subset is operation data describing each working condition unit; secondly, processing each subset with a normal performance label to obtain a plurality of reference subsets, wherein the data item in the reference subset is operation data describing each working condition unit in a normal performance status of the complex forming device; then, separately calculating the distances between each reference subset and each subset by using the shortest path algorithm and determining the performance set with a normal performance label, the performance set with a caring label, the performance set with a maintenance label, the performance set with a repair label, and the performance set with a replacement label of the complex forming device, wherein elements in the performance sets are the distances between the reference subset and the subset, that is, a performance standard of the complex forming device with the maintenance policy is established; further, obtaining actual operation data of a working cycle in the complex forming device, and determining an actual operation performance set of the complex forming device according to the actual operation data, the working condition hierarchical identification model, and the shortest path algorithm; finally, separately calculating Euclidean distances between the actual operation performance set and the performance set with a normal performance label, the performance set with a caring label, the performance set with a maintenance label, the performance set with a repair label, and the performance set with a replacement label, and selecting Euclidean distances within a specified threshold range; and determining a winning Euclidean distance according to the selected Euclidean distances by using a voting method; and determining a label, with a maintenance policy, of the sample data set corresponding to the winning Euclidean distance, and determining the maintenance policy denoted in the label with the maintenance policy as the maintenance policy of the complex forming device. In view of this, by using the method and system provided in the present invention, a suitable maintenance policy can be selected for the complex forming device, thereby reducing maintenance costs.

BRIEF DESCRIPTION OF THE DRAWINGS

To describe the technical solutions of the embodiments of the present invention or the prior art more clearly, the following briefly introduces the accompanying drawings required for describing the embodiments. Apparently, the accompanying drawings in the following description show merely some embodiments of the present invention, and a person of ordinary skill in the technology may still derive other drawings from these accompanying drawings without creative efforts.

DETAILED DESCRIPTION OF THE PRESENT INVENTION

The following clearly and completely describes the technical solutions in the embodiments of the present invention with reference to the accompanying drawings in the embodiments of the present invention. Apparently, the described embodiments are some of the embodiments of the present invention rather than all of the embodiments. All other embodiments obtained by a person of ordinary skill in the art based on the embodiments in the present invention without creative efforts shall fall within the protection scope of the present invention.

When selecting a maintenance policy, the complex forming device selects from caring, replacement, maintenance, repair and other policies. Inappropriate selection of the maintenance policy may result in problems: unnecessarily increase in maintenance costs and failure to safe and reliable operation of the device. Therefore, a method and system for determining a maintenance policy of a complex forming device provided in the present invention determine the current performance of the complex forming device according to operation data and performance parameters of the complex forming device, and determines a suitable maintenance policy for the complex forming device with reference to use duration and maintenance history of the complex forming device, to reduce maintenance costs based on safe and reliable operation of the complex forming device. Namely, the method or system provided in the present invention aims to select a suitable maintenance policy for the complex forming device, to reduce maintenance costs.

To make the foregoing objective, features, and advantages of the present invention more comprehensible, the present invention is further described in detail below with reference to the accompanying drawings and specific implementations.

The method and system provided in the present invention include first establishing a performance judgement standard; secondly, obtaining actual operation data; and then, determining a performance stage of the complex forming device according to the actual operation data and the performance judgement standard, and determining the maintenance policy of the complex forming device according to the performance stage at which the complex forming device is located.

Figure 1:
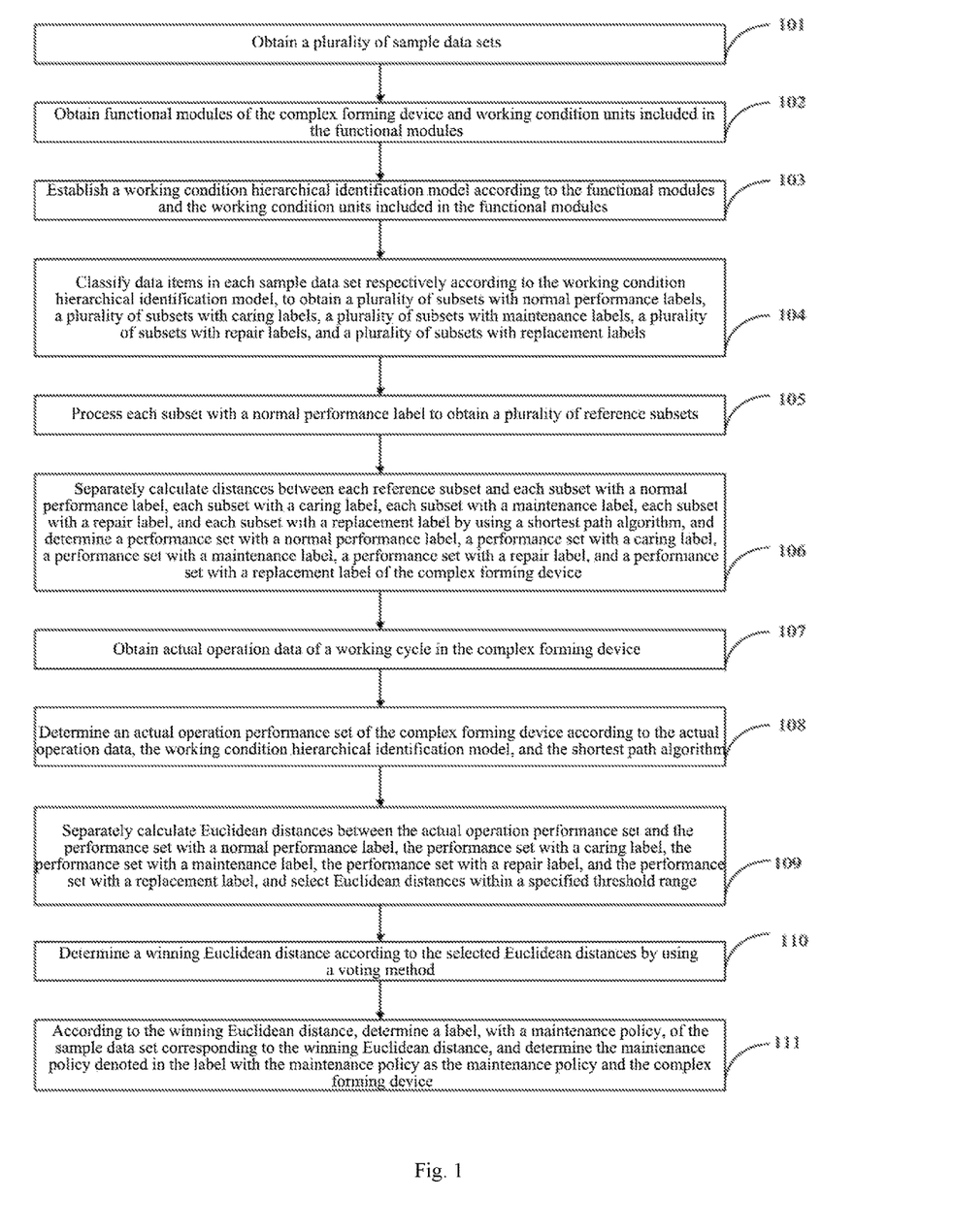
FIG. 1 is a schematic flowchart of a method for determining a maintenance policy according to an embodiment of the present invention.

FIG. 1 is a schematic flowchart of a method for determining a maintenance policy according to an embodiment of the present invention. As shown in FIG. 1, the maintenance policy determining method provided in the present invention specifically includes the following steps.

Step 101: Obtain a plurality of sample data sets, wherein the sample data sets are sample data sets with maintenance policy labels, and the maintenance policy labels include a normal performance label, a caring label, a maintenance label, a repair label, a replacement label, and the like; wherein each sample data set includes a plurality of pieces of data; each piece of data includes n data items; first n−1 data items of each piece of data are operation data of the complex forming device; and an nth data item of each piece of data is a maintenance policy label of the complex forming device. The maintenance policy label is determined according to different stages of the complex forming device (a normal performance stage, a caring stage, a maintenance stage, a repair stage, and a replacement stage; marks of the stages are manually marked by experts with reference to the operating status of the complex forming device and the quality of the formed product), namely, the corresponding maintenance policy is determined according to a stage at which the current performance of the complex forming device is located.

Step 102: Obtain functional modules of the complex forming device and working condition units included in the functional modules.

Step 103: Establish a working condition hierarchical identification model according to the functional modules and the working condition units included in the functional modules.

Step 104: Classify data items in each sample data set respectively according to the working condition hierarchical identification model, to obtain a plurality of subsets with normal performance labels, a plurality of subsets with caring labels, a plurality of subsets with maintenance labels, a plurality of subsets with repair labels, and a plurality of subsets with replacement labels, wherein the data item in each subset is operation data describing each working condition unit.

Step 105: Process each subset with a normal performance label to obtain a plurality of reference subset, wherein the data item in the reference subset is operation data describing each working condition unit in a normal performance status of the complex forming device.

Step 106: Separately calculate distances between each reference subset and each subset with a normal performance label, each subset with a caring label, each subset with a maintenance label, each subset with a repair label, and each subset with a replacement label by using a shortest path algorithm, and determine a performance set with a normal performance label, a performance set with a caring label, a performance set with a maintenance label, a performance set with a repair label, and a performance set with a replacement label of the complex forming device, wherein elements in the performance sets are the distances between the reference subset and the subset with a normal performance label, the subset with a caring label, the subset with a maintenance label, the subset with a repair label, and the subset with a replacement label respectively.

Step 107: Obtain actual operation data of a working cycle in the complex forming device.

Step 108: Determine an actual operation performance set of the complex forming device according to the actual operation data, the working condition hierarchical identification model, and the shortest path algorithm.

Step 109: Separately calculate Euclidean distances between the actual operation performance set and the performance set with a normal performance label, the performance set with a caring label, the performance set with a maintenance label, the performance set with a repair label, and the performance set with a replacement label, and select Euclidean distances within a specified threshold range.

Step 110: Determine a winning Euclidean distance according to the selected Euclidean distances by using a voting method.

Step 111: According to the winning Euclidean distance, determine a label, with a maintenance policy, of the sample data set corresponding to the winning Euclidean distance, and determine the maintenance policy denoted in the label with the maintenance policy as the maintenance policy and the complex forming device.

Because the performance change curve of the complex forming device is non-linear and has relatively large association with a historical status and in addition, working conditions of different types correspond to different performance estimations, status data of different working conditions need to be first separated, and data of different working conditions are processed differently by using a local modeling method. In the present invention, data items in a sample data set are classified into corresponding working condition units by using step 102 to step 104, so as to make different processings according to data in the different working condition units.

Figure 2:
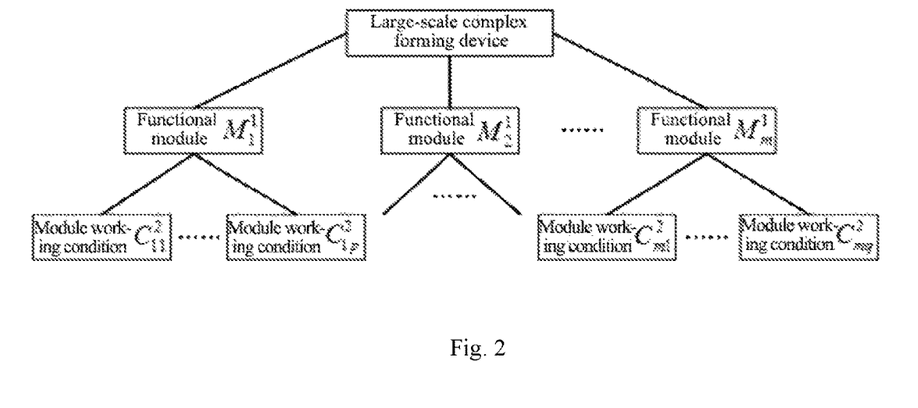
FIG. 2 is a schematic structural diagram of a working condition hierarchical identification model according to an embodiment of the present invention.

Because a plurality of functional modules of the complex forming device cooperate with each other, the working manner is relatively complex, and it is relatively difficult to determine the overall working condition of the device during working condition identification, and the feature that a plurality of functional modules cooperate with each other in parallel of the complex forming device is not satisfied, data items in a sample data set first need to be classified according to the described functional modules, for example, functional modules are divided into a transmission module, a power module, a hydraulic module, or the like, different functional modules have respective different working conditions, for example, the hydraulic module has four working conditions: stopping, idle stork descending, low speed compression, and decompression and returning, and subsequently working condition statues of functional modules where the data items are located need to be respectively identified in the functional modules. Therefore, in the present invention, before the data items in a sample data set are classified, first, the working condition hierarchical identification model shown in FIG. 2 is established according to the functional modules included in the complex forming device and the working condition units included in the functional modules.

Step 104 includes:

Step 1041: Classify the data items in each sample data set respectively according to a description requirement of each functional module in the working condition hierarchical identification model, to obtain a plurality of feature subsets with normal performance labels, a plurality of feature subsets with caring labels, a plurality of feature subsets with maintenance labels, a plurality of feature subsets with repair labels, and a plurality of feature subsets with replacement labels, wherein the data item in the feature subset is operation data describing the functional module.

Step 1042: Obtain operating status sample data of each working condition unit; use a neural network allocation algorithm according to the operating status sample data of each working condition unit to obtain a trained neural network model; and input each feature subset with a normal performance label, each feature subset with a caring label, each feature subset with a maintenance label, each feature subset with a repair label, and each feature subset with a replacement label into the trained neural network model, to obtain a plurality of subsets with normal performance labels, a plurality of subsets with caring labels, a plurality of subsets with maintenance labels, a plurality of subsets with repair labels, and a plurality of subsets with replacement labels.

For data items in a sample data set, features describing different functional modules are selected from all data items according to a description requirement of each functional module. That is, feature subsets describing different functional modules are established according to data items, and then the data items are sequentially classified according to the working condition units in which different functional modules are located. As shown in FIG. 2, by classifying matching data items into the working condition unit $M_m^1$ under the functional module $C_{mq}^2$, input of the working condition hierarchical identification model is a plurality of sample data sets, and output is the working condition units in which different functional modules, into which data items are classified, of the complex forming device are located.

To perform hierarchical searching, first data describing different functional modules is distinguished, a new feature subset is established, and then a working condition unit to which the functional module belongs is identified, so that a search amount for working condition identification can be greatly reduced. Replacing the working condition description of the entire device with the working condition of each functional module is clearer, facilitating subsequent performance estimation.

Step 1041 specifically includes: filtering features of operation data collected by a sensor connected to a functional module physical module, to obtain a feature subset. If the foregoing selected feature subset is insufficient to describe a functional module, features generated by a basic information module, such as an energy supply module or a basic information module, are selected. If information of the functional module still fails to be completely described after the features generated by the foregoing basic information module are selected, feature data of remaining functional modules is selected for supplement, until the data is sufficient to describe the functional module.

Once a feature subset of each functional module is determined, the feature subset is used as a fixed feature subset of a working condition hierarchical identification model. For example, a fixed feature subset of an $m^{th}$ sub functional module is $F^m(f_1^m, f_2^m, \ldots, f_l^m)$, l represents the number of elements in the feature subset $F^m(f_1^m, f_2^m, \ldots, f_l^m)$ of the $m^{th}$ sub functional module.

Figure 3:
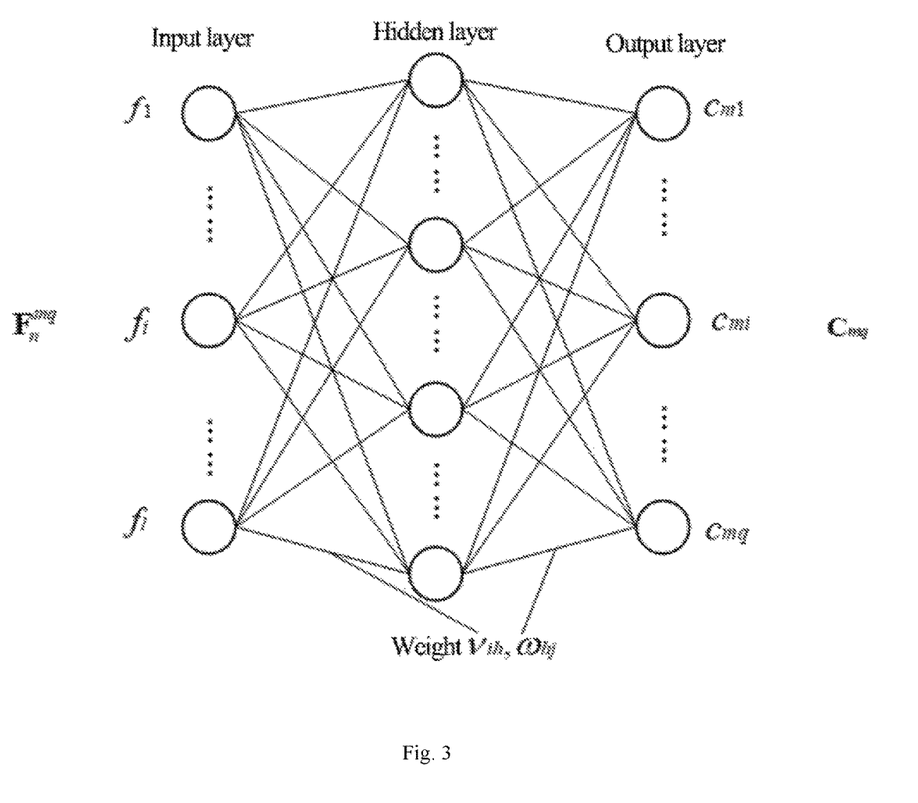
FIG. 3 is a schematic structural diagram of a neural network according to an embodiment of the present invention.

Step 1042 specifically includes: obtaining different feature subsets of different functional modules by using step 1042, selecting some of the feature subsets, obtaining time information of data items in the selected feature subsets, manually observing each time point, allocating the data items in the feature subsets to working condition units, and using manually allocated data items as training samples, and allocating data items in all feature subsets to the working condition units by using a neural network allocation algorithm. For example, a $g^{th}$ working condition unit of the $m^{th}$ sub functional module is denoted as $c_g^m$ (0, 0, . . . 0, 1, 0, . . . , 0, 0), wherein g=1, 2, . . . , q, and in the $g^{th}$ working condition unit, a $g^{th}$ feature in a vector is 1, and the remaining features are 0. A training sample is denoted as $F_i^m(f_1^m, f_2^m, \ldots, f_l^m)$, wherein i=1, 2, . . . n, and n is the number of feature subsets of the $m^{th}$ sub functional module. A manual neural network working condition identification model is constructed at each functional module node. A neural network model shown in FIG. 3 is established.

For example, a working condition identification neural network of the $m^{th}$ functional module is established. N feature subsets of the $m^{th}$ functional module are used as input, working condition units in which the feature subsets are located are used as output, and working condition units in which some different feature subsets are located as used as training samples for learning, so as to establish a mapping relationship between a feature subset and a working condition unit in which the feature subset is located.

The training sample requires the network to adjust all connecting weight coefficients and thresholds of nerve cells, so as to obtain an ideal result on nerve cells of an output layer, and then another sample is provided, and the network is required to continue to complete learning the sample data. Training can be completed when an average error E of the system meets the following formula:

$$E = \sum_{k=1}^{n} \sum_{t=1}^{q} (C_t^k - O_t)/2 < \varepsilon, \quad (1)$$

wherein $C_t^k$ is an expected output value corresponding to the $k^{th}$ sample data and $t^{th}$ output node, that is, a marking output value of a working condition in which the sample data is located; $O_t$ is an actual output value of the $t^{th}$ output node; $\varepsilon$ is a manually set value; n is the number of feature subsets included in a functional module; and q represents the number of working condition units included in the functional module.

Step 105 specifically includes:

each subset with a normal performance label including a plurality of numeric data items and a plurality of non-numeric data items;

for the numeric data items, calculating an average value of the plurality of numeric data items;

for the non-numeric data items, obtaining a standard value of the plurality of non-numeric data items by using a mode method; and obtaining the reference subset of each working condition unit according to the average value and the standard value. For example, a reference subset of a $q^{th}$ working condition of the $m^{th}$ functional module is $S_q^m(S_1^{mq}, S_2^{mq}, \ldots, S_l^{mq})$ l data items in the reference subset are operation data describing each working condition unit in a normal performance status of the complex forming device.

A performance status of the complex forming device is measured by using distances between status data of the complex forming device in different working conditions units of different functional modules and normal reference data. A longer distance indicates poorer performance of the complex forming device, and a shorter distance indicates better performance of the complex forming device. Because the status data of the complex forming device is high-dimensional data, a distance between current device data and normal reference is calculated by using a shortest path algorithm, to place actual historical data into a distance metering system, thereby making the finally obtained performance data more reliable.

Step 106 specifically includes:

Step 1061: Separately calculate the distances between each reference subset and each subset by using the shortest path algorithm.

First, for example, a normal reference $S_q^m(S_1^{mq}, S_2^{mq}, \ldots, S_l^{mq})$ of the $q^{th}$ working condition unit of the $m^{th}$ functional module and a sample data set $Z_g^m(z_1^m, z_2^m, \ldots, z_l^m)$ of each working condition unit of the $m^{th}$ functional module are input, to determine j neighbors of each $Z_g^m(z_1^m, z_2^m, \ldots, z_l^m)$. A distance between $Z_g^m(z_1^m, z_2^m, \ldots, z_l^m)$ and the j neighbors are set to an Euclidean distance, and a distance between and other points are set to infinite.

Secondly, the distance between each $Z_g^m(z_1^m, z_2^m, \ldots, z_l^m)$ and $S_q^m(S_1^{mq}, S_2^{mq}, \ldots, S_l^{mq})$ is calculated by invoking a shortest path algorithm.

The basic idea of the shortest path algorithm is to divide all data points in a data set into two groups, wherein V represents a set of data points of a marked shortest path, and a set of remaining data points of the unmarked shortest paths is $\overline{V}$. At an initial status, the set V includes only a start point $S_q^m(S_1^{mq}, S_2^{mq}, \ldots, S_l^{mq})$; the $\overline{V}$ includes data points other than the start point $S_q^m(S_1^{mq}, S_2^{mq}, \ldots, S_l^{mq})$; in this case, the current shortest path of the data points is from the start point to a weight on an arc of the data point; then vertexes $\overline{V}$ with shortest path lengths in a vertex set V are constantly selected from the set u; that is, data points are added to the set V; once a new vertex V is added to the set u, vertexes in the marked set V and the unmarked set $\overline{V}$ need to be separately modified. A new shortest path length value of each vertex in the set $\overline{V}$ is a smaller value in the original shortest path length values. This process is repeated until the set V includes all vertexes in the graph (that is, all vertexes are marked).

Related concept of the shortest path:

Graph: that is, dual pair (V,E) denoted as G(V,E), wherein V is a set of vertexes, and in this patent, is a set of data points in a data set, and E is an edge set.

Directed graph, that is, ordered dual pair (V,E), denoted as D=(V,A). V is a set of vertexes, and A is a set of arcs. The directed graph is a graph in which all edges have directions.

Weighted graph: that is, in the graph G(V,E), each edge $(v_i, v_j)$ has a number $\omega_{ij}$ corresponding to the edge, and the number $\omega_{ij}$ is a weight of the edge $(v_i, v_j)$.

Connected graph: setting $v_i$ and $v_j$ to be two points in the graph G; if there is a link from the point $v_i$ to the point $v_j$, it is said that the $v_i$ is connected to the $v_j$; if any pair of vertexes in the graph G is connected, the graph G is referred to as a connected graph.

$d_{ij}$ is defined as the distance between the vertexes i and j in the graph, that is, $$d_{ij} = \begin{cases} \omega_{ij}, & i \text{ and } j \text{ are adjacent} \\ +\infty, & i \text{ and } j \text{ are not adjacent} \\ 0, & i \text{ and } j \text{ are equal} \end{cases}$$

For the present invention, a plurality of training samples, that is, each subset $Z_g^m(z_1^m, z_2^m, K, z_l^m)$, wherein g=1, 2, \ldots, q and the start point $S_q^m(S_1^{mq}, S_2^{mq}, K, z_l^{mq})$, are given, and the steps of calculating the shortest path from the start point $S_q^m(S_1^{mq}, S_2^{mq}, K, z_l^{mq})$ to each point sample are as follows:

starting from the start point $s=S_q^m(S_1^{mq}, S_2^{mq}, \ldots, S_l^{mq})$, marking each sample, and denoting the sample as $L_{ij}$, wherein $L_{ij}$ is the shortest path from the sample i to the sample j; $L_{ss}$ is 0 (the shortest path from the vertex to itself is 0), marking the start point $s=S_q^m(S_1^{mq}, S_2^{mq}, \ldots, S_l^{mq})$ as "0", which indicates that the point has been marked; making the point $s \in V$, wherein the remaining points all belong to $\overline{V}$;

starting from the start point s, finding a sample i adjacent to and closest to the point s, using a value of $L_{si}=L_{ss}+L_{si}$ as a mark of the sample i, which indicates that the sample $i=F_i^m(f_1^m, f_2^m, \ldots, f_l^m)$ has been marked, making $(s,i) \in V$, wherein the remaining samples all belong to $\nabla$;

finding all unmarked samples (that is, breadth-first search) adjacent to the marked sample, and if $L_{sj}=\min\{L_{ss}+d_{sj}, L_{si}+d_{ij}\}$, marking the sample j; and making $(s,i,j) \in V$, wherein the remaining samples all belong to $\nabla$.

The foregoing operation is repeated, until all the samples are marked (that is, the set $\nabla$ is empty), and the algorithm ends.

The foregoing operation is repeated for n times, to obtain a shortest path from s to each sample.

The performance set with a normal performance label, the performance set with a caring label, the performance set with a maintenance label, the performance set with a repair label, and the performance set with a replacement label are obtained by means of the foregoing operation. For example, the complex forming device is at a caring stage and has m functional modules; the m sub functional modules have r working conditions in total; by means of the foregoing operation, the performance set of the complex forming device at the caring stage is $G_i=(g^1, g^2, \ldots, g_r)$.

Step 1062: Obtain a weight of each distance according to a cross validation algorithm. That is, a weight of each element in the performance set with a normal performance label, the performance set with a caring label, the performance set with a maintenance label, the performance set with a repair label, and the performance set with a replacement label of the complex forming device is determined according to the cross validation algorithm.

Step 1063: Determine the performance set with a normal performance label, the performance set with a caring label, the performance set with a maintenance label, the performance set with a repair label, and the performance set with a replacement label of the complex forming device according to the distances between the reference subset and each subset and the weights of the distances. That is, in the final performance set, each element has a product between a distance and a weight corresponding to the distance.

Step 1064: Calculate distances between device status data of different working conditions of different sub functional modules and normal reference data, to obtain performance statuses of the different sub functional modules.

Step 108 specifically includes:

classifying the actual operation data according to the working condition hierarchical identification model, to obtain a plurality of subsets of the actual operation data; and calculating, by using the shortest path algorithm, distances between the reference subset and each subset of the actual operation data, and determining the actual operation performance set of the complex forming device.

Step 110: Determine a winning Euclidean distance according to the selected Euclidean distances by using a voting method. For example, six Euclidean distances are selected within a specified range, and are respectively 0 Euclidean distance between the actual operation performance set and the performance set with a normal performance label, 1 Euclidean distance between the actual operation performance set and the performance set with a caring label, 1 Euclidean distance between the actual operation performance set and the performance set with a maintenance label, 3 Euclidean distances between the actual operation performance set and the performance set with a repair label, and 1 Euclidean distance between the actual operation performance set and the performance set with a replacement label. Then, according to a voting method, the minority is subordinate to the majority, and the winner is the Euclidean distances between the actual operation performance set and the performance set with a repair label.

Then it is determined that the current maintenance policy of the complex forming device is a repair policy according to the winning Euclidean distances between the actual operation performance set and the performance set with a repair label.

To achieve the foregoing objective, the present invention further provides a system for determining a maintenance policy of a complex forming device.

Figure 4:
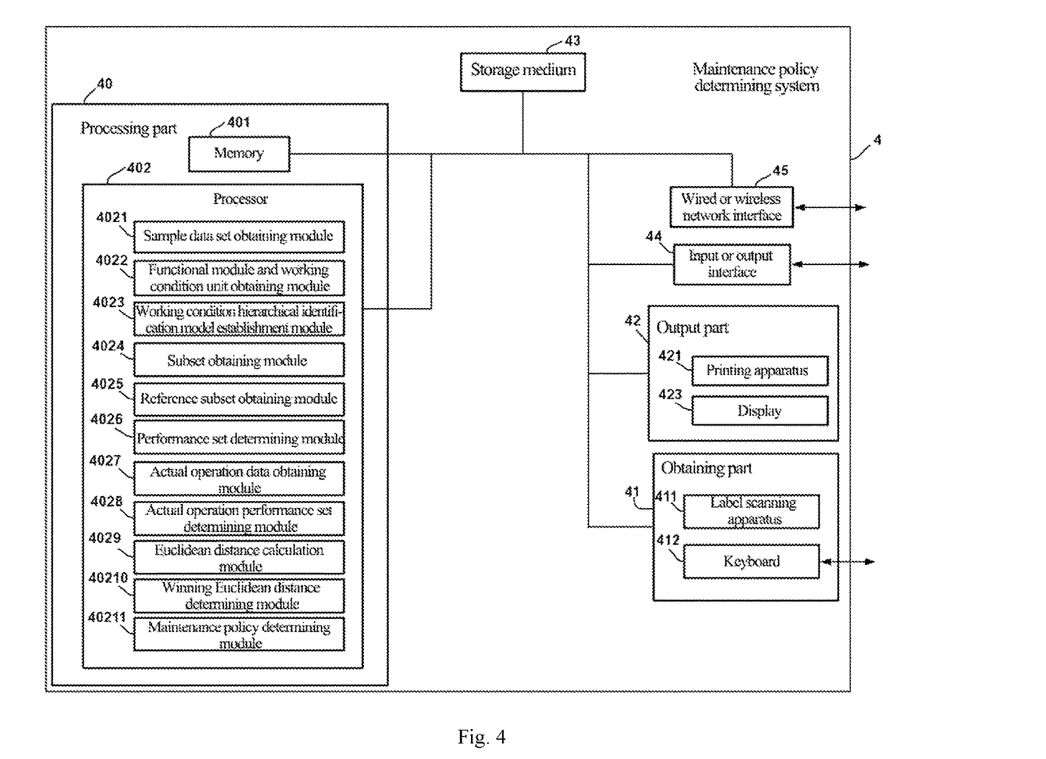
FIG. 4 is a schematic structural diagram of a system for determining a maintenance policy according to an embodiment of the present invention.

FIG. 4 is a schematic structural diagram of a system for determining a maintenance policy according to an embodiment of the present invention. As shown in FIG. 4, the maintenance policy determining system 4 includes:

an obtaining part 41 and a processing part 40; wherein the obtaining part 41 is communicatively connected to the processing part 40; and the processing part includes one or more non-volatile memories 401, and a processor 402, wherein the processor 402 includes:

a sample data set obtaining module 4021 configured to obtain a plurality of sample data sets by using the obtaining part 41; and the sample data sets are sample data sets with maintenance policy labels, and the maintenance policy labels include a normal performance label, a caring label, a maintenance label, a repair label, and a replacement label;

a functional module and working condition unit obtaining module 4022 configured to obtain functional modules of the complex forming device and working condition units included in the functional modules by using the obtaining part 41;

a working condition hierarchical identification model establishment module 4023 configured to establish a working condition hierarchical identification model according to the functional modules and the working condition units included in the functional modules;

a subset obtaining module 4024 configured to classify data items in each sample data set respectively according to the working condition hierarchical identification model, to obtain a plurality of subsets with normal performance labels, a plurality of subsets with caring labels, a plurality of subsets with maintenance labels, a plurality of subsets with repair labels, and a plurality of subsets with replacement labels, wherein the data item in each subset is operation data describing each working condition unit;

a reference subset obtaining module 4025 configured to process each subset with a normal performance label to obtain a plurality of reference subsets, wherein the data item in the reference subset is operation data describing each working condition unit in a normal performance status of the complex forming device;

a performance set determining module 4026 configured to use a shortest path algorithm, separately calculate distances between each reference subset and each subset with a normal performance label, each subset with a caring label, each subset with a maintenance label, each subset with a repair label, and each subset with a replacement label, and determine a performance set with a normal performance label, a performance set with a caring label, a performance set with a maintenance label, a performance set with a repair label, and a performance set with a replacement label of the complex forming device, wherein elements in the performance sets are the distances between the reference subset and the subset with a normal performance label, the subset with a caring label, the subset with a maintenance label, the subset with a repair label, and the subset with a replacement label respectively;

an actual operation data obtaining module 4027 configured to obtain actual operation data of a working cycle in the complex forming device;

an actual operation performance set determining module 4028 configured to determine an actual operation performance set of the complex forming device according to the actual operation data, the working condition hierarchical identification model, and the shortest path algorithm;

an Euclidean distance calculation module 4029 configured to separately calculate Euclidean distances between the actual operation performance set and the performance set with a normal performance label, the performance set with a caring label, the performance set with a maintenance label, the performance set with a repair label, and the performance set with a replacement label, and select Euclidean distances within a specified threshold range;

a winning Euclidean distance determining module 40210 configured to determine a winning Euclidean distance according to the selected Euclidean distances by using a voting method; and a maintenance policy determining module 40211 configured to: according to the winning Euclidean distance, determine a label, with a maintenance policy, of the sample data set corresponding to the winning Euclidean distance, and determine the maintenance policy denoted in the label with the maintenance policy as the maintenance policy of the complex forming device.

The subset obtaining module 4024 specifically includes:

a feature subset obtaining unit configured to classify the data items in each sample data set respectively according to a description requirement of each functional module in the working condition hierarchical identification model, to obtain a plurality of feature subsets with normal performance labels, a plurality of feature subsets with caring labels, a plurality of feature subsets with maintenance labels, a plurality of feature subsets with repair labels, and a plurality of feature subsets with replacement labels, wherein the data item in the feature subset is operation data describing the functional module;

a working condition unit operating status sample data obtaining unit configured to obtain operating status sample data of each working condition unit;

a trained neural network model obtaining unit configured to use a neural network allocation algorithm according to the operating status sample data of each working condition unit to obtain a trained neural network model; and a subset obtaining unit configured to input each feature subset with a normal performance label, each feature subset with a caring label, each feature subset with a maintenance label, each feature subset with a repair label, and each feature subset with a replacement label into the trained neural network model, to obtain a plurality of subsets with normal performance labels, a plurality of subsets with caring labels, a plurality of subsets with maintenance labels, a plurality of subsets with repair labels, and a plurality of subsets with replacement labels.

The reference subset obtaining module 4025 specifically includes:

an average value calculation unit configured to calculate an average value of the plurality of numeric data items when data items of the subset with a normal performance label are numeric data items;

a standard value obtaining unit configured to obtain a standard value of the plurality of non-numeric data items by using a mode method when the data items of the subset with a normal performance label are non-numeric data items; and a reference subset obtaining unit configured to obtain the reference subset of each working condition unit according to the average value and the standard value.

The performance set determining module 4026 specifically includes:

a distance calculation unit configured to separately calculate the distances between each reference subset and each subset by using the shortest path algorithm;

a weight obtaining unit configured to obtain a weight of each distance according to a cross validation algorithm; and a performance set determining unit configured to determine the performance set with a normal performance label, the performance set with a caring label, the performance set with a maintenance label, the performance set with a repair label, and the performance set with a replacement label of the complex forming device according to the distances between the reference subset and each subset and the weights of the distances.

The actual operation performance set determining module 4028 specifically includes:

an actual operation data subset obtaining unit configured to classify the actual operation data according to the working condition hierarchical identification model, to obtain a plurality of subsets of the actual operation data; and an actual operation performance set determining unit configured to calculate, by using the shortest path algorithm, distances between the reference subset and each subset of the actual operation data, and determine the actual operation performance set of the complex forming device.

In a specific embodiment, the system 4 may further include an output part 42 and a storage medium 43; the system 4 may generate a relatively large different due to a different configuration or performance, and may include one or more central processing units (CPU) 402 (for example, one or more processors) and a memory 401, one or more storage application programs, or storage media 43 of data (for example, one or more mass storage devices). The memory 401 and the storage medium 43 may be transient or persistent storages. Further, the central processing unit 402 may be configured to communicate with the memory 401 and storage medium 43, and perform, on the system 4, a series of instructions and operations in the memory 401 and the storage medium 43.

In some embodiments, the obtaining part 41 includes a label scanning apparatus 411 or a keyboard 412; a normal performance label, a caring label, a maintenance label, a repair label, and a replacement label are scanned by using the scanning apparatus 411 to obtain a plurality of sample data sets; alternatively, barcode sequence numbers of the normal performance label, the caring label, the maintenance label, the repair label, and the replacement label may also be input by using the keyboard 412 to obtain a plurality of sample data sets; certainly, the barcode sequence numbers may also be input by using a touch screen display to obtain a plurality of sample data sets; the obtaining part 41 further includes various sensors or sensing apparatuses of other types installed on the complex forming device, for identifying and reading functions and working conditions of the complex forming device.

In a preferred implementation, the output part 42 includes a label printing apparatus 421 or display 423, and a maintenance policy, and a normal performance label, a caring label, a maintenance label, a repair label, and a replacement label are printed or displayed by using the label printing apparatus 421 or display 423.

The system 4 may further include one or more wired or wireless network interfaces 45. By using the wired or wireless network interfaces 45, the system 4 can remotely obtain a plurality of sample data sets and functional modules, and working condition units included in the functional modules.

The system 4 may further include one or more input and output interfaces 44, which, for example, may also be a touch display screen, or manual feedback text information is input by using the keyboard 412.

The system 4 may include one or more operating systems, for example, Windows Server™, Mac OS X™, Unix™, Linux™, and FreeBSD™.

The obtaining part 41, the processing part 40, and the output part 42 of the system 4 read information and execute instructions by using communicative connection of the wired or wireless network interface 45 or the input and output interface 44.

Based on the foregoing descriptions of the implementations, a person skilled in the art may clearly learn that the present invention may be implemented by software in addition to necessary universal hardware or by dedicated hardware only, including a dedicated integrated circuit, a dedicated CPU, a dedicated memory, a dedicated component and the like. Usually, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, as for the present invention, software program implementation is a better implementation in most cases. Based on such an understanding, the technical solutions of the present invention or the part that makes contributions to the prior art can be substantially embodied in the form of a software product. The computer software product is stored in a readable storage medium, for example, a floppy disk, a USB flash disk, a removable hard disk, a read-only memory (ROM), a random access memory (RAM), a magnetic disk, or an optical disk of the computer, and includes several instructions used to instruct a computer device (for example, a personal computer, a server, or a network device) to perform the methods according to the embodiments of the present invention.

The foregoing embodiments may be separately implemented according to requirements, or may be implemented by combining different implementations.

Therefore, the method or system provided in the present invention separates status data of different working conditions by using the working condition hierarchical identification model and the neural network model, to avoid the problem that it is difficult to estimate the performance of the complex forming device by directly using the operation data of the complex forming device. The distance between data of the complex forming device at different performance stages and standard data is calculated by using a shortest path algorithm, and a performance set of the complex forming device located at different performance stages is described by using the distance. That is, the functions of the complex forming device located at different performance stages are quantitatively described, and a performance judgement standard is established. Actual operation data is obtained, and a performance stage of the complex forming device is determined according to the actual operation data and the performance judgement standard, and the maintenance policy of the complex forming device is determined according to the performance stage at which the complex forming device is located. In view of this, by using the method and system provided in the present invention, a suitable maintenance policy can be selected for the complex forming device, to reduce maintenance costs. Namely, maintenance costs are reduced based on safe and reliable operation of the complex forming device.

The system disclosed in the embodiments corresponds to the method disclosed in the embodiments and therefore is briefly described, and reference may be made to the description in method part for the associated part.

In this specification, specific examples are applied to illustrate the principle and implementations of the present invention, and the descriptions of the foregoing embodiments are merely used for helping understand the method and the core idea of the present invention. In addition, for a person of ordinary skill in the art, both the specific implementations and application ranges are changed according to the idea of the present invention. Based on the above, the content of this specification should not be understood as a limitation to the present invention.

What is claimed is:

1. A method executed by a computer for determining a maintenance policy of a complex forming device, wherein the maintenance policy determining method comprises:

obtaining a plurality of sample data sets, wherein the sample data sets are sample data sets with maintenance policy labels, and the maintenance policy labels comprise a normal performance label, a caring label, a maintenance label, a repair label, and a replacement label;

obtaining functional modules of the complex forming device and working condition units comprised in the functional modules;

establishing a working condition hierarchical identification model according to the functional modules and the working condition units comprised in the functional modules; and classifying data items in each sample data set respectively according to the working condition hierarchical identification model, to obtain a plurality of subsets with normal performance labels, a plurality of subsets with caring labels, a plurality of subsets with maintenance labels, a plurality of subsets with repair labels, and a plurality of subsets with replacement labels, wherein the data items in each subset is operation data describing each working condition unit; specifically, classifying the data items in each sample data set respectively according to a description requirement of each functional module in the working condition hierarchical identification model, to obtain a plurality of feature subsets with normal performance labels, a plurality of feature subsets with caring labels, a plurality of feature subsets with maintenance labels, a plurality of feature subsets with repair labels, and a plurality of feature subsets with replacement labels, wherein the data item in the feature subset is operation data describing the functional module; obtaining operating status sample data of each working condition unit; using a neural network allocation algorithm according to the operating status sample data of each working condition unit to obtain a trained neural network model; inputting each feature subset with a normal performance label, each feature subset with a caring label, each feature subset with a maintenance label, each feature subset with a repair label, and each feature subset with a replacement label into the trained neural network model, to obtain a plurality of subsets with normal performance labels, a plurality of subsets with caring labels, a plurality of subsets with maintenance labels, a plurality of subsets with repair labels, and a plurality of subsets with replacement labels;

processing each subset with a normal performance label to obtain a plurality of reference subsets, wherein the data item in the reference subset is operation data describing each working condition unit in a normal performance status of the complex forming device; specifically, each subset with a normal performance label comprises a plurality of numeric data items and a plurality of non-numeric data items; for the numeric data items, calculating an average value of the plurality of numeric data items; for the non-numeric data items, obtaining a standard value of the plurality of non-numeric data items by using a mode method; obtaining the reference subset of each working condition unit according to the average value and the standard value;

separately calculating distances between each reference subset and each subset with a normal performance label, each subset with a caring label, each subset with a maintenance label, each subset with a repair label, and each subset with a replacement label by using a shortest path algorithm, and determining a performance set with a normal performance label, a performance set with a caring label, a performance set with a maintenance label, a performance set with a repair label, and a performance set with a replacement label of the complex forming device, wherein elements in the performance sets are the distances between the reference subset and the subset with a normal performance label, the subset with a caring label, the subset with a maintenance label, the subset with a repair label, and the subset with a replacement label respectively; specifically, separately calculating the distances between each reference subset and each subset by using the shortest path algorithm; obtaining a weight of each distance according to a cross validation algorithm; determining the performance set with a normal performance label, the performance set with a caring label, the performance set with a maintenance label, the performance set with a repair label, and the performance set with a replacement label of the complex forming device according to the distances between the reference subset and each subset and the weights of the distances;

obtaining actual operation data of a working cycle in the complex forming device;

determining an actual operation performance set of the complex forming device according to the actual operation data, the working condition hierarchical identification model, and the shortest path algorithm; specifically, classifying the actual operation data according to the working condition hierarchical identification model, to obtain a plurality of subsets of the actual operation data; calculating, by using the shortest path algorithm, distances between the reference subset and each subset of the actual operation data, and determining the actual operation performance set of the complex forming device;

separately calculating Euclidean distances between the actual operation performance set and the performance set with a normal performance label, the performance set with a caring label, the performance set with a maintenance label, the performance set with a repair label, and the performance set with a replacement label, and selecting Euclidean distances within a specified threshold range;

determining a winning Euclidean distance according to the selected Euclidean distances by using a voting method; and according to the winning Euclidean distance, determining a label, with a maintenance policy, of the sample data set corresponding to the winning Euclidean distance, and determining the maintenance policy denoted in the label with the maintenance policy as the maintenance policy of the complex forming device.

2. A system for determining a maintenance policy of a complex forming device, wherein the maintenance policy determining system comprises:

an obtaining part and a processing part; wherein the obtaining part is communicatively connected to the processing part; and the processing part comprises one or more non-volatile memories, and a processor, wherein the processor comprises a sample data set obtaining module configured to obtain a plurality of sample data sets by using the obtaining part; and the sample data sets are sample data sets with maintenance policy labels, and the maintenance policy labels comprise a normal performance label, a caring label, a maintenance label, a repair label, and a replacement label;

a functional module and working condition unit obtaining module configured to obtain functional modules of the complex forming device and working condition units comprised in the functional modules by using the obtaining part;

a working condition hierarchical identification model establishment module configured to establish a working condition hierarchical identification model according to the functional modules and the working condition units comprised in the functional modules;

a subset obtaining module configured to classify data items in each sample data set respectively according to the working condition hierarchical identification model, to obtain a plurality of subsets with normal performance labels, a plurality of subsets with caring labels, a plurality of subsets with maintenance labels, a plurality of subsets with repair labels, and a plurality of subsets with replacement labels, wherein the data item in each subset is operation data describing each working condition unit; and the subset obtaining module specifically comprises:

a feature subset obtaining unit configured to classify the data items in each sample data set respectively according to a description requirement of each functional module in the working condition hierarchical identification model, to obtain a plurality of feature subsets with normal performance labels, a plurality of feature subsets with caring labels, a plurality of feature subsets with maintenance labels, a plurality of feature subsets with repair labels, and a plurality of feature subsets with replacement labels, wherein the data item in the feature subset is operation data describing the functional module;

a working condition unit operating status sample data obtaining unit configured to obtain operating status sample data of each working condition unit;

a trained neural network model obtaining unit configured to use a neural network allocation algorithm according to the operating status sample data of each working condition unit to obtain a trained neural network model; and a subset obtaining unit configured to input each feature subset with a normal performance label, each feature subset with a caring label, each feature subset with a maintenance label, each feature subset with a repair label, and each feature subset with a replacement label into the trained neural network model, to obtain a plurality of subsets with normal performance labels, a plurality of subsets with caring labels, a plurality of subsets with maintenance labels, a plurality of subsets with repair labels, and a plurality of subsets with replacement labels;

a reference subset obtaining module configured to process each subset with a normal performance label to obtain a plurality of reference subsets, wherein the data item in the reference subset is operation data describing each working condition unit in a normal performance status of the complex forming device; and the reference subset obtaining module specifically comprises:

an average value calculation unit configured to calculate an average value of the plurality of numeric data items when data items of the subset with a normal performance label are numeric data items;

a standard value obtaining unit configured to obtain a standard value of the plurality of non-numeric data items by using a mode method when the data items of the subset with a normal performance label are non-numeric data items; and a reference subset obtaining unit configured to obtain the reference subset of each working condition unit according to the average value and the standard value;

a performance set determining module configured to use a shortest path algorithm, separately calculate distances between each reference subset and each subset with a normal performance label, each subset with a caring label, each subset with a maintenance label, each subset with a repair label, and each subset with a replacement label, and determine a performance set with a normal performance label, a performance set with a caring label, a performance set with a maintenance label, a performance set with a repair label, and a performance set with a replacement label of the complex forming device, wherein elements in the performance sets are the distances between the reference subset and the subset with a normal performance label, the subset with a caring label, the subset with a maintenance label, the subset with a repair label, and the subset with a replacement label respectively; and the performance set determining module specifically comprises:

a distance calculation unit configured to separately calculate the distances between each reference subset and each subset by using the shortest path algorithm;

a weight obtaining unit configured to obtain a weight of each distance according to a cross validation algorithm; and a performance set determining unit configured to determine the performance set with a normal performance label, the performance set with a caring label, the performance set with a maintenance label, the performance set with a repair label, and the performance set with a replacement label of the complex forming device according to the distances between the reference subset and each subset and the weights of the distances;

an actual operation data obtaining module configured to obtain actual operation data of a working cycle in the complex forming device;

an actual operation performance set determining module configured to determine an actual operation performance set of the complex forming device according to the actual operation data, the working condition hierarchical identification model, and the shortest path algorithm, wherein the actual operation performance set determining module specifically comprises:

an actual operation data subset obtaining unit configured to classify the actual operation data according to the working condition hierarchical identification model, to obtain a plurality of subsets of the actual operation data; and an actual operation performance set determining unit configured to calculate, by using the shortest path algorithm, distances between the reference subset and each subset of the actual operation data, and determine the actual operation performance set of the complex forming device;

an Euclidean distance calculation module configured to separately calculate Euclidean distances between the actual operation performance set and the performance set with a normal performance label, the performance set with a caring label, the performance set with a maintenance label, the performance set with a repair label, and the performance set with a replacement label, and select Euclidean distances within a specified threshold range;

a winning Euclidean distance determining module configured to determine a winning Euclidean distance according to the selected Euclidean distances by using a voting method; and a maintenance policy determining module configured to: according to the winning Euclidean distance, determine a label, with a maintenance policy, of the sample data set corresponding to the winning Euclidean distance, and determine the maintenance policy denoted in the label with the maintenance policy as the maintenance policy of the complex forming device.

* * * * *

UNITED STATES PATENT AND TRADEMARK OFFICE
CERTIFICATE OF CORRECTION

PATENT NO. : 10,318,931 B2  
APPLICATION NO. : 16/137558  
DATED : June 11, 2019  
INVENTOR(S) : Zhang et al.

Page 1 of 1

It is certified that error appears in the above-identified patent and that said Letters Patent is hereby corrected as shown below:

On the Title Page

Item (72), should read:  
Qiang Zhang, Anhui (CN);  
Wanying Wang, Anhui (CN);  
Jianwen Yan, Anhui (CN);  
Zhanglin Peng, Anhui (CN);  
Xianonong Lu, Anhui (CN);  
Jun Pei, Anhui (CN);  
Yu Fan, Anhui (CN)

Signed and Sealed this  
Thirtieth Day of March, 2021

Drew Hirshfeld  
*Performing the Functions and Duties of the*  
*Under Secretary of Commerce for Intellectual Property and*  
*Director of the United States Patent and Trademark Office*